Feb. 2, 1926.
S. G. DOWN
BRAKE SHOE CONSTRUCTION
Filed Nov. 1, 1923
1,571,241
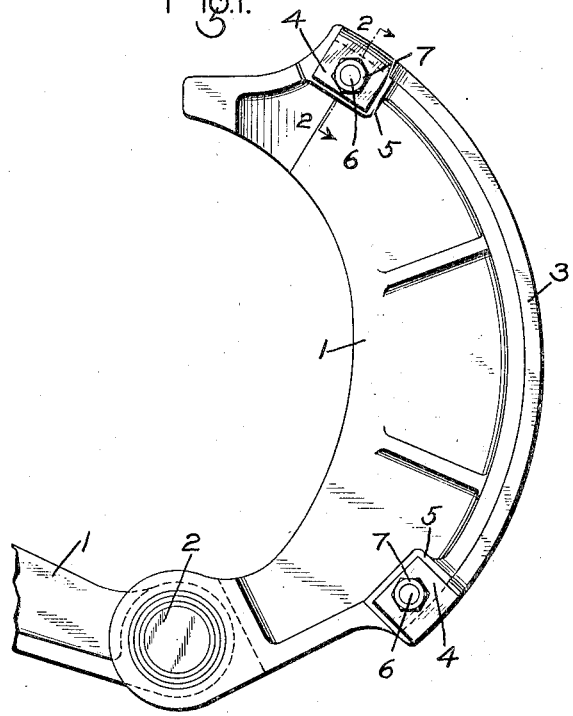
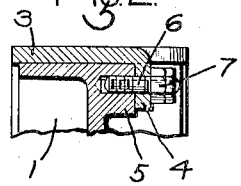
INVENTOR
SIDNEY G. DOWN
BY *Wm. N. Cady*
ATTORNEY Patented Feb. 2, 1926.

1,571,241

UNITED STATES PATENT OFFICE.

SIDNEY G. DOWN, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

BRAKE-SHOE CONSTRUCTION.

Application filed November 1, 1923. Serial No. 672,116.

*To all whom it may concern:*

Be it known that I, SIDNEY G. DOWN, a citizen of the United States, residing at Pittsburgh, in the county of Allegheny and State of Pennsylvania, have invented new and useful Improvements in Brake-Shoe Constructions, of which the following is a specification.

This invention relates to brake shoes, and more particularly to a brake shoe construction adapted for an internal expanding drum type of brake, such as employed on motor vehicles.

The principal object of my invention is to provide an improved brake shoe construction of the above character.

In the accompanying drawing; Fig. 1 is an elevational view of a brake head, showing my improved brake shoe construction applied thereto; and Fig. 2 a section on the line 2—2 of Fig. 1.

The brake head 1 is of the usual internal expanding type having a pivot pin 2 connecting the two brake heads and having an arcuate face for receiving a brake shoe 3. The brake heads 1 are adapted to be expanded by the usual cam (not shown) so as to bring the brake shoes 3 into frictional engagement with the internal friction face of a brake drum (not shown).

According to my invention the brake shoe 3 comprises a metallic plate formed to engage the arcuate face of the brake head 1. At each end of the brake shoe and at one side, the plate is cut transversely and the cut portion is bent downwardly to form a lug 4.

At opposite ends of the arcuate face, the brake head is provided with a thickened portion or boss 5 which is adapted to aline with the corresponding lug 4 of the brake shoe. A stud 6 is screwed into each boss 5 and each lug 4 is apertured to receive the corresponding stud.

The brake shoe is applied by an axial movement of the shoe with respect to the brake head, and when in position on the brake head, a nut 7 is applied to each stud 6, so as to secure the brake shoe in place.

As the brake shoe is applied by an axial movement, it is not necessary to remove the vehicle wheel when it is desired to replace a worn brake shoe.

Having now described my invention, what I claim as new and desire to secure by Letters Patent, is:—

The combination with a brake head having an arcuate face, of a brake shoe comprising a plate formed to engage said arcuate face and having a transverse cut at each end and at one side of the brake shoe, the cut portion being bent inwardly from the edge of the shoe to form a lug in a radial plane at right angles to the axis of the vehicle wheel and means for securing said lugs to said brake head.

In testimony whereof I have hereunto set my hand.

SIDNEY G. DOWN.